Patented May 3, 1932

1,856,211

UNITED STATES PATENT OFFICE

ERNST FELLMER AND HEINRICH HOYER, OF LEVERKUSEN-ON-THE-RHINE, GERMANY, ASSIGNORS TO GENERAL ANILINE WORKS, INC., OF NEW YORK, N. Y., A CORPORATION OF DELAWARE

NEW SECONDARY TRISAZODYESTUFFS

No Drawing. Application filed September 4, 1930, Serial No. 479,792, and in Germany September 11, 1929.

The present invention relates to new secondary trisazodyestuffs, more particularly it relates to dyestuffs of the probable general formula:

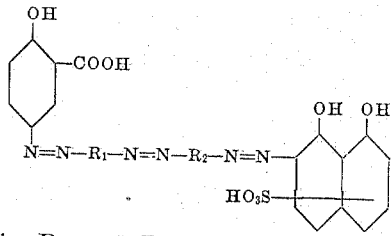

wherein $R_1$ and $R_2$ stand for naphthalene nuclei, and wherein all nuclei may be further substituted by alkyl, oxalkyl or a sulfonic acid group.

Our new dyestuffs are obtainable by further diazotizing an amino-disazo body of the general formula:

wherein R stands for the residue of salicylic acid or of a derivative thereof, or the residue of a 1.8-dihydroxynaphthalene-sulfonic acid or a derivative thereof, R' stands for the naphthalene nucleus of a diazotized middle component of the naphthalene series and R" stands for the naphthalene nucleus of a diazotizable middle component of the naphthalene series and coupling in the case where R indicates salicylic acid or a derivative thereof with a sulfonic acid of 1.8-dihydroxynaphthalene or a derivative thereof and in case where R indicates 1.8-dihydroxynaphthalene-sulfonic acid or a derivative thereof with salicylic acid or a derivative thereof.

Our new dyestuffs are in the form of their alkali metal salts watersoluble dark powders, dyeing cotton, viscose and mixed fabrics containing viscose grey shades, which besides a very good fastness to light are distinguished by the technically important property of being unaffected by brightening and of not being boiled off. Due to the salicylic acid grouping and the 1.8-hydroxynaphthalene residue the dyestuffs are capable of forming copper and chromium lakes in substance or by subsequent treatment on the fiber, which lakes exhibit good fastness to washing. By subsequently treating the direct dyeing with diazotized p-nitraniline a beautiful neutral grey is obtained.

The invention is illustrated by the following examples, without being restricted thereto:

*Example 1.*—15.3 parts by weight of p-aminosalicylic acid, after diazotization with hydrochloric acid and 6.9 parts by weight of sodium nitrite, are combined with 22.3 parts by weight of 1-naphthylamine-7-sulfonic acid in a solution rendered weakly acid by means of acetic acid. When the coupling is complete, the monoazo dyestuff is further diazotized with 6.9 parts by weight of sodium nitrite and hydrochloric acid and coupled with 18.0 parts by weight of the hydrochloride of α-naphthylamine in the presence of sodium acetate. The resulting amino disazo body is carefully purified by isolation from the solution rendered alkaline, further diazotized at 0° C. with 6.9 parts by weight of sodium nitrite and coupled with 24 parts by weight of 1.8-dihydroxynaphthalene-4-sulfonic acid in the presence of sodium acetate or sodium bicarbonate. The dyestuff having in the free state the following formula:

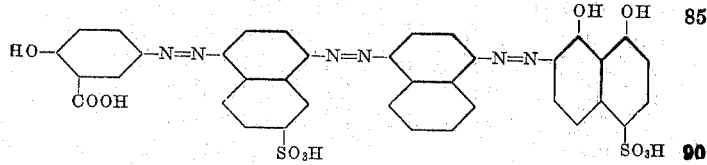

is isolated in the customary manner. It dyes cotton in bluish grey shades, which are unaffected by brightening and which possess very good fastness to light.

*Example 2.*—28.0 parts by weight of acetyl-1.4-naphthylenediamine-6-(7-)-sulfonic acid are diazotized at 0° C. with hydrochloric acid and 6.9 parts by weight of sodium nitrite and coupled with 24.5 parts by weight of the sodium salt of naphthalene-1-sulfaminic acid in the presence of sodium acetate, further diazotized with hydrochloric acid and 6.9 parts by weight of sodium nitrite and coupled with cooling with 13.8 parts by weight of salicylic acid in a solution rendered alkaline by means of sodium carbonate. The reaction mixture is boiled for half an hour in dilute caustic soda solution in order to split off the acetyl group and the resulting amino disazo body is isolated after neutralization of the lye. The product is stirred again, further diazotized with cooling with 6.9 parts by weight of sodium nitrite and hydrochloric acid and coupled with 24 parts by weight of 1.8-dihydroxynaphthalene-4-sulfonic acid in the presence of sodium acetate or sodium bicarbonate. The dyestuff having in its free state the following formula:

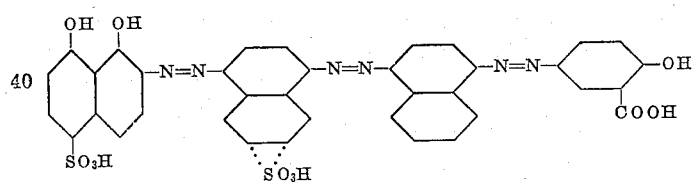

is isolated in the customary manner; it dyes cotton in greenish blue-gray shades, which are unaffected by brightening and which possess very good fastness to light.

This group of dyestuffs can likewise be built up by diazotizing acyl-1.4-naphthylenediamines or sulfonic acids thereof, coupling with salicylic acid, saponifying in caustic alkali solution, further diazotizing and coupling with a middle component of the naphthalene series, diazotizing once again and finally coupling with 1.8-dihydroxynaphthalene sulfonic acid or derivatives thereof.

We claim:
1. As new products azodyestuffs of the probable general formula:

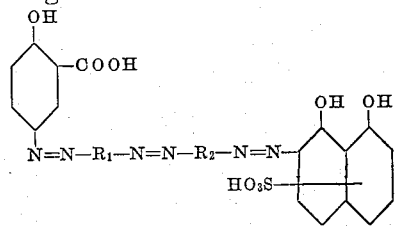

wherein $R_1$ and $R_2$ stand for naphthalene nuclei and wherein all nuclei may be further substituted by alkyl, alkoxy or a sulfonic acid group, being in the form of their alkali metal salts watersoluble dark powders, dyeing cotton, viscose and mixed fabrics containing viscose grey shades of good fastness to light which shades are unaffected by brightening and are not boiled off.

2. As new products azodyestuffs of the probable general formula:

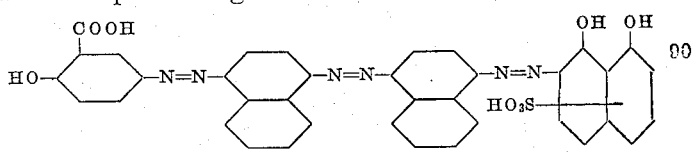

wherein all nuclei may be further substituted by alkyl, alkoxy or a sulfonic acid group, being in the form of their alkali metal salts watersoluble dark powders, dyeing cotton, viscose and mixed fabrics containing viscose grey shades of good fastness to light which shades are unaffected by brightening and are not boiled off.

3. As a new product the azodyestuff of the formula:

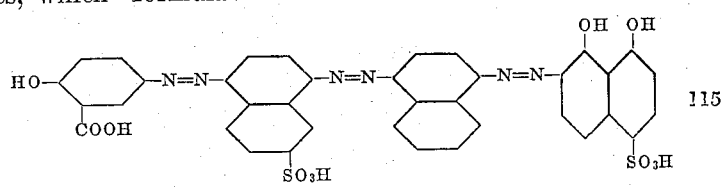

dyeing cotton in bluish grey shades of good fastness to light which shades are unaffected by brightening.

In testimony whereof, we affix our signatures.

ERNST FELLMER.
HEINRICH HOYER.